(12) United States Patent
Kato

(10) Patent No.: US 8,060,465 B2
(45) Date of Patent: Nov. 15, 2011

(54) DATA MANAGEMENT SYSTEM, AND INFORMATION PROCESSING DEVICE AND COMPUTER READABLE MEDIUM THEREFOR

(75) Inventor: Hiroshi Kato, Aichi (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 364 days.

(21) Appl. No.: 12/076,577

(22) Filed: Mar. 20, 2008

(65) Prior Publication Data

US 2008/0243940 A1    Oct. 2, 2008

(30) Foreign Application Priority Data

Mar. 29, 2007   (JP) ................. 2007-089862

(51) Int. Cl.
*G06F 17/30* (2006.01)
(52) U.S. Cl. ............. 707/609; 707/803; 707/E17.009
(58) Field of Classification Search ............ None
See application file for complete search history.

(56) References Cited

U.S. PATENT DOCUMENTS

| | | | | |
|---|---|---|---|---|
| 2006/0235887 A1* | 10/2006 | Abe et al. | ............... | 707/104.1 |
| 2007/0077925 A1* | 4/2007 | Hiyama | ............... | 455/420 |
| 2009/0293068 A1* | 11/2009 | Yagiu | ............... | 719/318 |

FOREIGN PATENT DOCUMENTS

| | | |
|---|---|---|
| JP | 2003-345451 A | 12/2003 |
| JP | 2006-323546 | 11/2006 |
| JP | 2007-034923 A | 2/2007 |

OTHER PUBLICATIONS

Notice of Allowance dated Jun. 28, 2011 issued in Japanese counterpart application No. 2007-089862.

\* cited by examiner

*Primary Examiner* — Shyue Jiunn Hwa
(74) *Attorney, Agent, or Firm* — Scully, Scott, Murphy & Presser, P.C.

(57) ABSTRACT

A data management system includes an external device and information processing device communicably connected with the external device. The information processing device includes a data sending unit sending a data file to the external device, a specifying information storing unit storing data specifying information, a request unit sending a request for data information regarding a data file stored in the external device to the external device, a response receiving unit receiving the data information as a response to the request, a judging unit judging whether the data file specified by the data information includes the data file specified by the data specifying information, and a deletion request unit sending a deletion request for deleting the data file specified by the data specifying information to the external device when the judgment is affirmative.

11 Claims, 8 Drawing Sheets

DATA MANAGEMENT SYSTEM, AND INFORMATION PROCESSING DEVICE AND COMPUTER READABLE MEDIUM THEREFOR

CROSS-REFERENCE TO RELATED APPLICATION

This application claims priority under 35 U.S.C. §119 from Japanese Patent Application No. 2007-089862 filed on Mar. 29, 2007. The entire subject matter of the application is incorporated herein by reference.

BACKGROUND

1. Technical Field

The following description relates to one or more data management techniques that make it possible to appropriately delete data stored in an external device communicably connected with an information processing device.

2. Related Art

Conventionally, there has been known a technique employed in an information processing device such as a personal computer, digital multifunction peripheral, and DVD player that deals with personal information, in which technique there can be deleted information stored in the information processing device that is not used any more or is to be discarded so as to prevent leakage of information (e.g., Japanese Patent Provisional Publication No. 2006-323546).

Recently, such information processing devices have widely been installed not only into homes and offices but also into Internet cafés and hotels, and used by guests of the Internet cafes and hotels.

In the meantime, recently, there are some cases where information is stored not in an internal unit of the information processing device but in an external device connected therewith. For example, personal information is, in some cases, stored in another information processing device, such as a server via a network and an external hard disk drive, which is connected with the aforementioned information processing device.

SUMMARY

However, the above conventional technique is applicable to delete the personal information stored in the internal unit of the information processing device, yet not applicable to delete the personal information stored in the external device connected therewith. Therefore, when a user ends the use of the information processing device with belief that the personal information is completely deleted, the user might forget to delete the personal information stored in the external device connected with the information processing device.

Aspects of the present invention are advantageous in that there can be provided one or more improved data management systems that make it possible to properly delete data stored in an external device that is communicably connected with an information processing device, and one or more improved information processing devices and computer readable media applicable to the data management systems.

According to aspects of the present invention, there is provided a data management system, which includes an information processing device and an external device communicably connected with the information processing device. The information processing device includes a data sending unit configured to send a data file to the external device, a specifying information storing unit configured to store therein data specifying information for specifying the data file sent by the data sending unit, a request unit configured to send a request for data information regarding a data file stored in the external device to the external device, a response receiving unit configured to receive the data information as a response to the request by the request unit, a judging unit configured to judge whether the data file specified by the data information received by the response receiving unit includes the data file specified by the data specifying information stored in the specifying information storing unit, and a deletion request unit configured to send a deletion request for deleting the data file specified by the data specifying information to the external device when the judging unit judges that the data file specified by the data information includes the data file specified by the data specifying information. The external device includes a receiving unit configured to receive the data file sent by the data sending unit, an external-device-side storing unit configured to store therein the data file received by the receiving unit, a response sending unit configured to send the data information regarding the data file stored in the external-device-side storing unit to the information processing device as a response to the request sent by the request unit, and a data deleting unit configured to delete the data file stored in the external-device-side storing unit in response to the deletion request being sent by the deletion request unit.

According to another aspect of the present invention, there is provided an information processing device configured to be communicably connected with an external device, which includes a data sending unit configured to send a data file to the external device, a specifying information storing unit configured to store therein data specifying information for specifying the data file sent by the data sending unit, a request unit configured to send a request for data information regarding a data file stored in the external device to the external device, a response receiving unit configured to receive the data information as a response to the request by the request unit, a judging unit configured to judge whether the data file specified by the data information received by the response receiving unit includes the data file specified by the data specifying information stored in the specifying information storing unit, and a deletion request unit configured to send a deletion request for deleting the data file specified by the data specifying information to the external device when the judging unit judges that the data file specified by the data information includes the data file specified by the data specifying information.

According to some aspects of the present invention, even though a data file sent by the data sending unit is stored into the external device, the user who has used the information processing device can delete the data file stored in the external device. In this case, the deletion request unit of the information processing device sends a deletion request for deleting the data file, when it is judged that a data file specified by data information received from the external device includes the data file specified by the data specifying information. Therefore, the information processing device can appropriately delete the data file to be deleted that is stored in the external device.

According to a further aspect of the present invention, there is provided a computer readable medium having computer readable instructions stored thereon, which cause a computer configured to be communicably connected with an external device to perform a first step of sending a data file to the external device, a second step of storing data specifying information for specifying the data file sent in the first step, a third step of sending a request for data information regarding a data file stored in the external device to the external device, a fourth step of receiving the data information as a response to the request sent in the third step, a fifth step of judging whether the data file specified by the data information received in the fourth step includes the data file specified by the data specifying information stored in the second step, and a sixth step of sending a deletion request for deleting the data file specified by the data specifying information to the external device when it is judged in the fifth step that the data file specified by the data information includes the data file specified by the data specifying information.

According to the computer readable medium configured as above, the same effects as the aforementioned data management system and information processing device can be provided.

BRIEF DESCRIPTION OF THE ACCOMPANYING DRAWINGS

FIG. 1 schematically shows an entire configuration of a data management system in an embodiment according to one or more aspects of the present invention.

FIG. 2 schematically shows a hardware configuration of the data management system in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the invention will be described with reference to the accompanying drawings.

Figure 1:
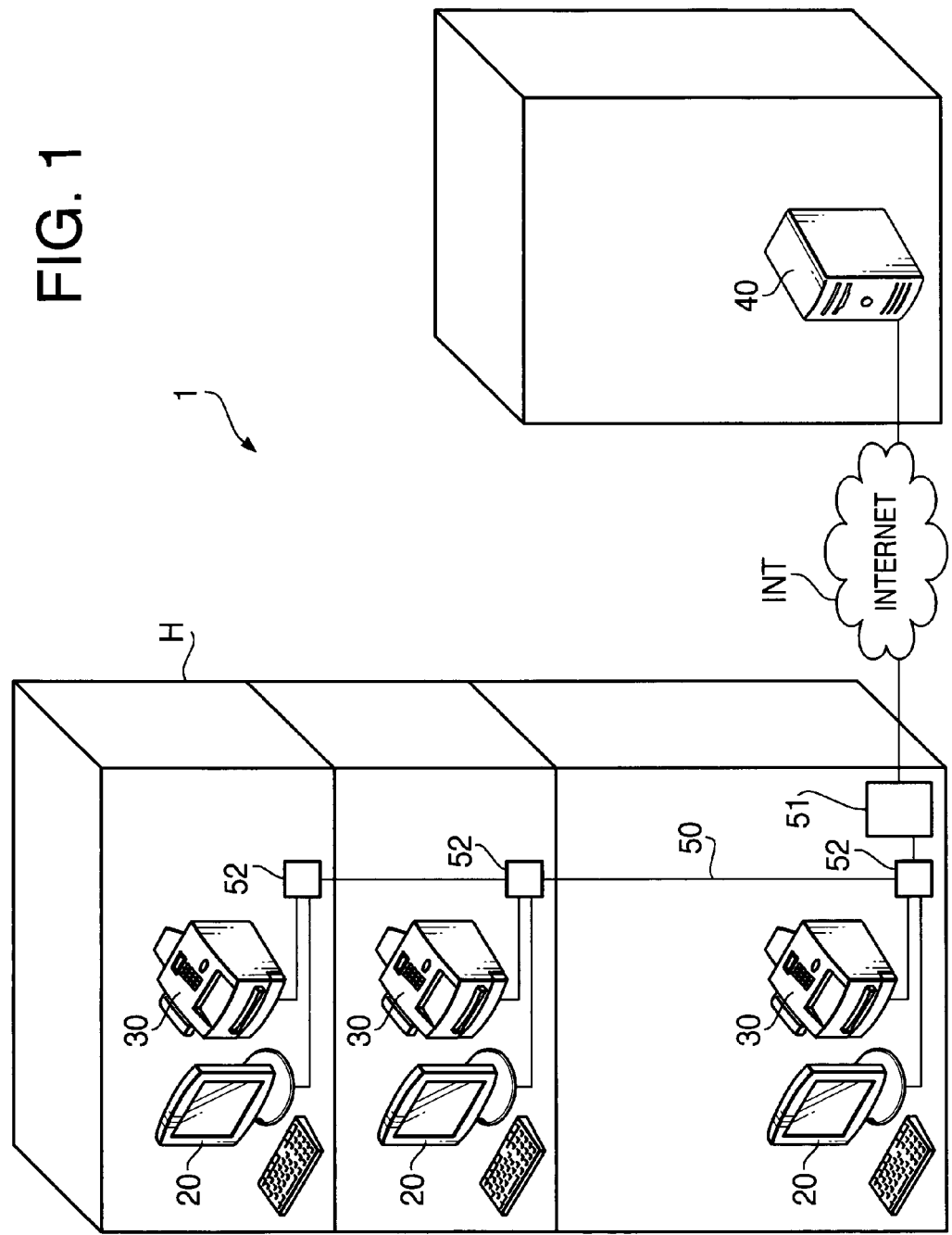

FIG. 1 schematically shows an entire configuration of a data management system 1 in the embodiment. As shown in FIG. 1, the data management system 1 in the embodiment according to aspects of the present invention is configured with a digital multifunction peripheral (MFP) 30 and personal computer (PC) 20 that are installed in each guest room of a hotel H, file server 40, and network that makes it possible to perform data communication therebetween.

The digital MFP 30 is an example of an information processing device according to aspects of the invention. The PCs 20 and digital MFP 30 installed in the hotel H are interconnected via a LAN 50. Each guest room has a hub 52 provided therein, and the digital MFP 30 and PC 20 installed in each guest room are connected to the hub 52. The LAN 50 is joined with an Internet INT via a router 51. Each of the digital MFPs 30 and PCs 20 is connected with the external file server 40 via the Internet INT. Incidentally, although there is shown in FIG. 1 only a single file server 40, it is needless to say that the digital MFP 30 is connectable with an arbitrary file server in case where a user can specify a destination to be connected with the digital MFP 30.

Figure 2:
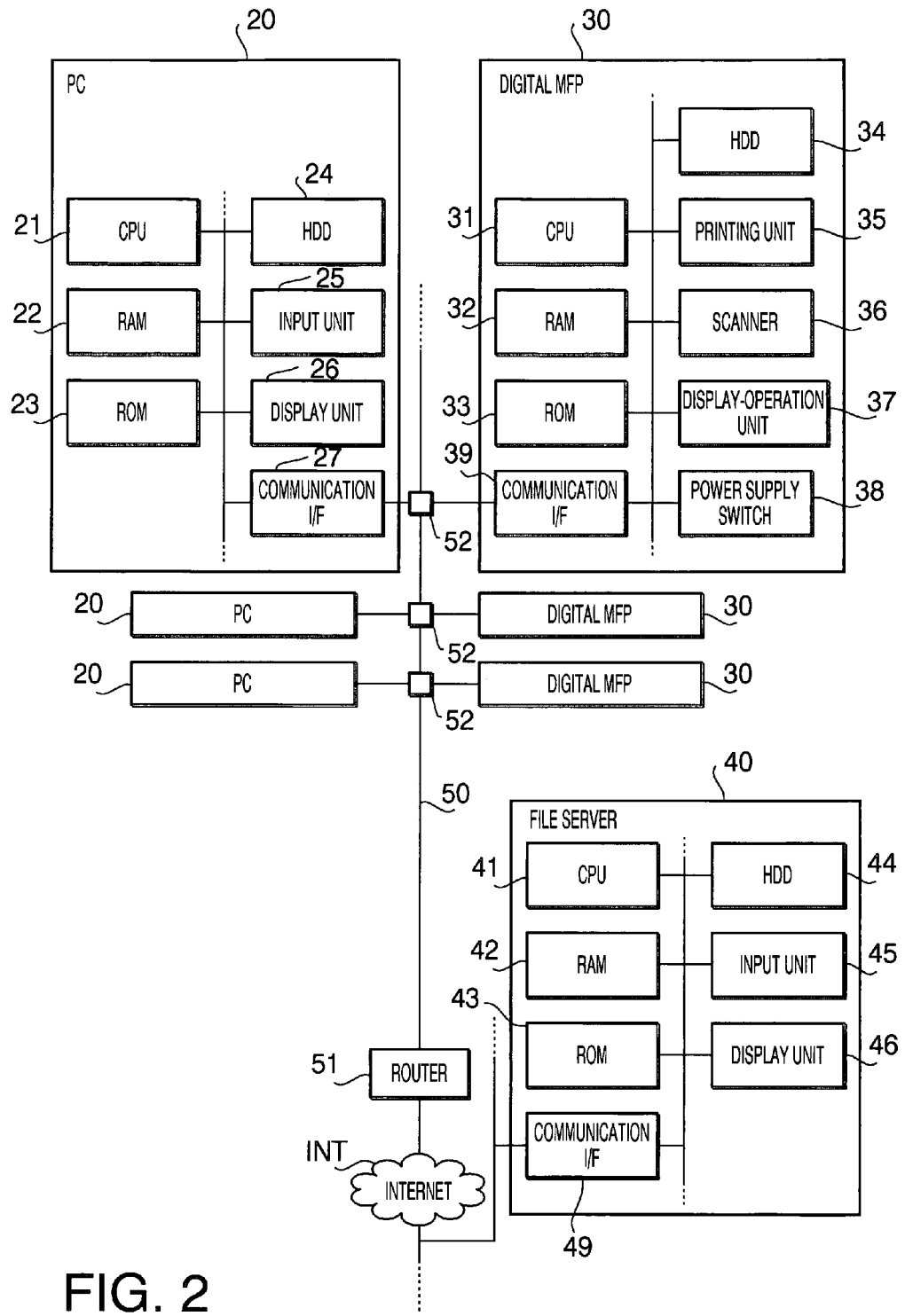

FIG. 2 schematically shows a hardware configuration of the data management system 1 in the embodiment. As shown in FIG. 2, the PC 20 is configured to be the same as a normal computer, and provided with a CPU (Central Processing Unit) 21, RAM (Random Access Memory) 22 as a volatile memory, ROM (Read Only Memory) 22, HDD (Hard Disk Drive) 24 as a high-capacity storage device, input unit 25 as an information input device including a keyboard and mouse, display unit 26 including a display device that displays information on a screen thereof, and communication I/F (Interface) through which information is sent to and received from an external device on the LAN 50 or Internet INT.

The digital MFP 30 is provided with a CPU 31, RAM 32, ROM 33, and communication I/F 39. The digital MFP 30 is further provided with an HDD 34 that stores thereon scanned data and various settings such as a transmission setting, printing unit 35 that forms an image on a paper based on image data included in print data, scanner 36 that scans an image as electronic data, display-operation unit 37 with a portion displaying thereon a message and buttons to be operated by the user, and power supply switch 38.

The display-operation unit 37 is provided with various buttons (not shown) such as a copy button, scan button, setting menu button in the same manner as a widely known digital MFP, and configured to perform various operations such as a copy operation, scanning operation, setting change, by operating the buttons.

The digital MFP 30 is configured to communicate with an external device on the LAN 50 or the Internet INT via the communication I/F 39.

Various programs for controlling the digital MFP 30 are stored in the ROM 33. With the various programs being executed, below-mentioned functional units are achieved.

The file server 40, which is an example of the external device, is configured to have the same hardware constitution as a normal computer, in the same manner as the PC 20. Specifically, the file server 40 is provided with a CPU 41, RAM 42, ROM 43, HDD 44, input unit 45, display unit 46, and communication I/F 49, and configured to communicate with an external device on the LAN 50 or the Internet INT.

Figure 3:
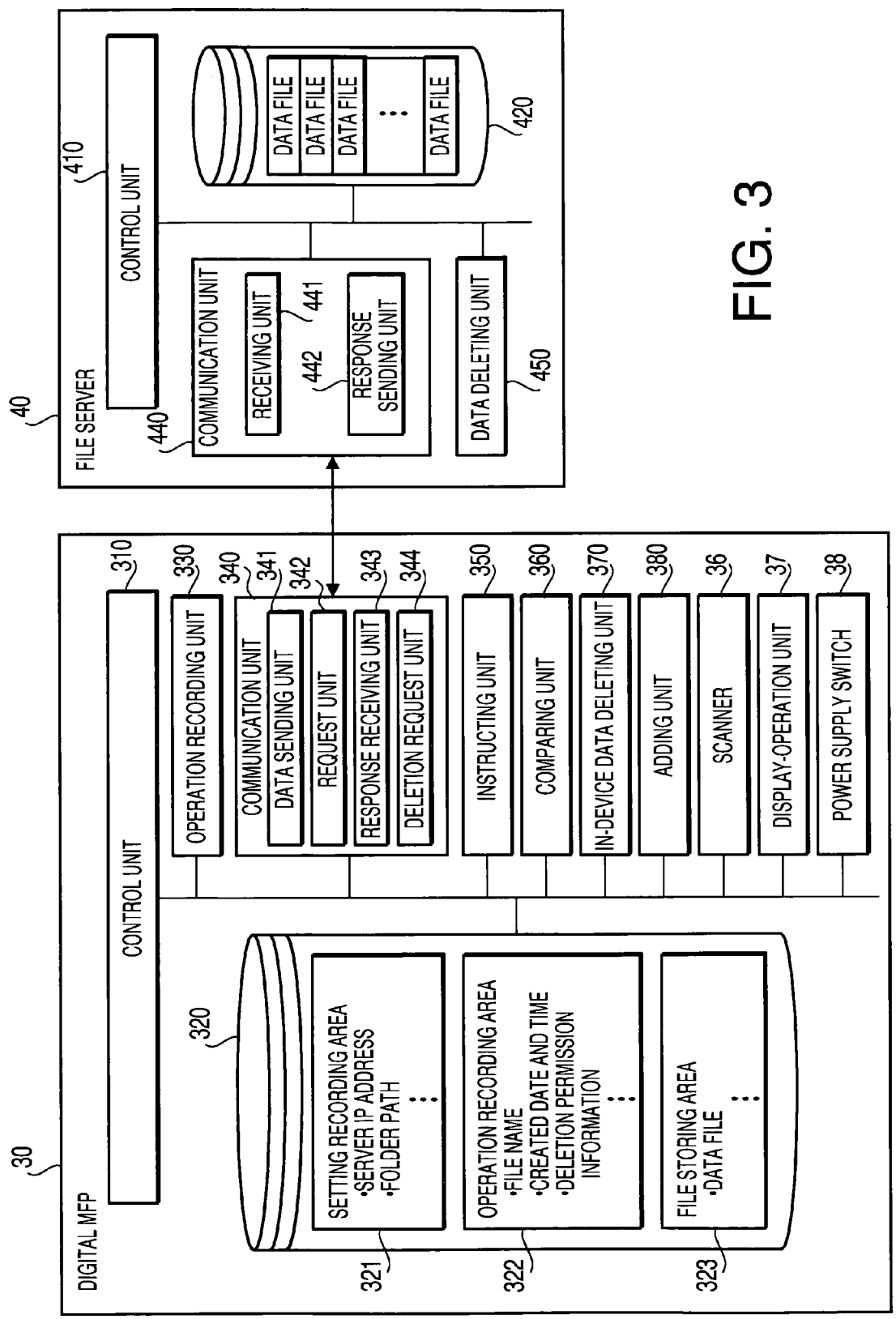
FIG. 3 is a functional block diagram of the data management system in the embodiment according to one or more aspects of the present invention.

Subsequently, referring to FIG. 3, functional aspects of the digital MFP 30 will be described. FIG. 3 is a functional block diagram of a data management device in the embodiment. The following functional units are achieved by executing programs stored in the ROM 33 with the CPU 31.

As shown in FIG. 3, the digital MFP 30 includes a control unit 310, storing unit 320, operation recording unit 330, communication unit 340, instructing unit 350, comparing unit 360, in-device data deleting unit 370, and adding unit 380. Furthermore, input/output through the display-operation unit 37 or power supply switch 38 is controlled by the control unit 310.

The control unit 310 performs information sending and receiving with the storing unit 320 and the functional units 330 to 380 of the digital MFP 30, and causes the functional units 330 to 380 to operate. The control unit 310 can be regarded to correspond to a portion including a so-called main flow of a program, while the functional units 330 to 380 can be regarded to correspond, for example, to procedures called out by the control unit 310.

The storing unit 320 is configured to store therein data transmitted by a data sending unit 341, namely, a data file of image data created by scanning an image with the scanner 36, and data specifying information as information specifying the data file. The storing unit 320 is provided with a setting recording area 321, operation recording area 322, and file storing area 323. The aforementioned data file is stored in the file storing area 323.

In addition, the aforementioned data specifying information is stored in the operation recording area 322. FIG. 3 shows a concrete example of the data specifying information, which includes a file name and file created date and time to specify the data file. In the operation recording area 322, deletion permission information is also stored. The deletion permission information is stored as information representing whether to delete the data file in a manner associated with the file name of the data file. In the setting recording area 321, there are stored a server IP address of the file server 40 as a destination where the data file is to be saved and information regarding a folder path of the destination.

The operation recording unit 330 is configured to record a user operation performed with the display-operation unit 37. When the scanner is instructed to be driven through the display-operation unit 37, the operation recording unit 330 makes the storing unit 320 store a history of operations performed through the display operation unit 37, and the file name and file created date and time of the image data scanned by the scanner 36 in the operation recording area of the storing unit 320.

The communication unit 340 is configured to perform data communication with an external device. The communication unit 340 includes the data sending unit 341, a request unit 342, a response receiving unit 343, and a deletion request unit 344. Data sending to and receiving from a USB memory (not shown) are also carried out by the communication unit 340. The data sending unit 341 is configured to send data to an external device. For example, the data sending unit 341 sends image data scanned by the scanner 36 to the external file server 40. The data sending unit 341 sends the deletion permission information added by the below-mentioned adding unit 380 along with a data file.

The request unit 342 is configured to request, of an external device, data information as information regarding data stored in the external device in response to a deletion command being issued by the below-mentioned instructing unit 350. The data information is, for example, a list of file names stored in the file server 40 as the external device, as information regarding data files of stored images. As a matter of course, the data information may include a list of other information such as created dates and times in addition to the file names, or may include only the list of the created dates and times.

The response receiving unit 343 is configured to receive data information as a response to the request issued by the request unit 342. For example, when the file server 40 sends the lists of the file names and/or created dates and times in response to the request issued by the request unit 342, the response receiving unit 343 receives the lists.

The deletion request unit 344 is configured to send a deletion request for deleting data specified by the data specifying information to the external device when it is judged that the data information includes information regarding the data specified by the data specifying information based on a comparison result by the below-mentioned comparing unit 360. For example, when the list of the file names that is received by the response receiving unit 343 includes a file name of a data file instructed by the instructing unit 350 to be deleted, the deletion request unit 344 sends a deletion request for deleting the data file to the external device.

The instructing unit 350 is configured to issue a deletion command when a predetermined condition is satisfied. The deletion command is issued to the control unit 310, and then the control unit 310 controls the request unit 342 in response to the deletion command. The deletion command includes information for specifying a data file to be deleted such as a file name and file created date and time of the data file. The predetermined condition under which the deletion command is issued can arbitrarily be configured. For example, the predetermined condition may includes a condition that the power supply switch 38 is turned off, a predetermined time period has elapsed, or it is time for a guest staying at the hotel H to check out. In addition, a deletion button with which the user can instruct to delete the data file may separately be provided to the digital MFP 30, and the deletion command may be issued in response to the deletion button being pressed.

The comparing unit 360 is configured to compare the data information received by the response receiving unit 343 with the data specifying information stored in the storing unit 320. For example, the comparing unit 360 judges whether the list of the file names as the data information includes a file name as one of the data specifying information included in the deletion command. The comparison result is sent to the control unit 310.

The in-device data deleting unit 370 is configured to delete data specified by the data specifying information from the storing unit 320 when it is judged that the data information does not include information regarding data specified by the data specifying information. In addition, the in-device data deleting unit 370 includes a data specifying information deleting unit, which is configured to delete the data specifying information from the operation recording area 322 of the storing unit 320 under a condition that the deletion request unit 344 issues the deletion request when the comparing unit 360 judges that the data information includes information regarding data specified by the data specifying information. It is noted that the in-device data deleting unit 370 also deletes a corresponding data file from the file storing area 323 when it is judged that the data information includes information regarding data specified by the data specifying information.

The adding unit 380 is configured to add, to a data file to be sent by the data sending unit 341, the deletion permission information representing whether to delete the data file. The aforementioned "whether to delete the data file" represents whether to delete the data file when the a predetermined condition is satisfied. For example, even though the instructing unit 350 issues the deletion command when turning the power supply switch 38 off, and the deletion request unit 350 is called up so as to delete the data file stored in the file server 40, when the deletion permission information of the data file represents "NO (disapproval of data deletion)," the file server does not delete the data file. Meanwhile, when the deletion permission information of the data file represents "YES (approval of data deletion)," the file server deletes the data file. Namely, when a status (YES/NO) represented by the deletion permission information is configured to be selected by the user, it is possible to leave the data file in the file server 40 or delete the data file from the file server 40.

Subsequently, functional aspects of the file server 40 will be described. The following functional units are achieved by executing programs stored in the HDD 44 with the CPU 41. As shown in FIG. 3, the file server 40 includes a control unit 410, storing unit 420, communication unit 440, and data deleting unit 450.

The control unit 410 calls up the functional units 440 and 450, or reads/writes information from/to the storing unit 420 in the same manner as the control unit 310 of the digital MFP 30.

The storing unit 420 is configured to store therein a data file sent by the digital MFP 30. For example, the storing unit 420 stores therein the deletion permission information sent by the digital MFP 30 in a manner associated with a corresponding data file.

The communication unit 440 is configured to perform data communication with an external device. The communication unit 440 includes a receiving unit 441 and response sending unit 442.

The receiving unit 441 is configured to receive data (i.e., data file) sent by the digital MFP 30.

The response sending unit 442 is configured to send, to the digital MFP 30, data information, which is information regarding data received by the receiving unit 441, such as a list of file names in response to a request issued by the digital MFP 30.

The data deleting unit 450 is configured to delete a data file from the string unit 420 when the digital MFP 30 issues a request for deleting the data file. The data deleting unit 450 refers to the deletion permission information as received, and deletes the data file when the data file is specified as a subject to be deleted in the deletion permission information.

Figure 4:
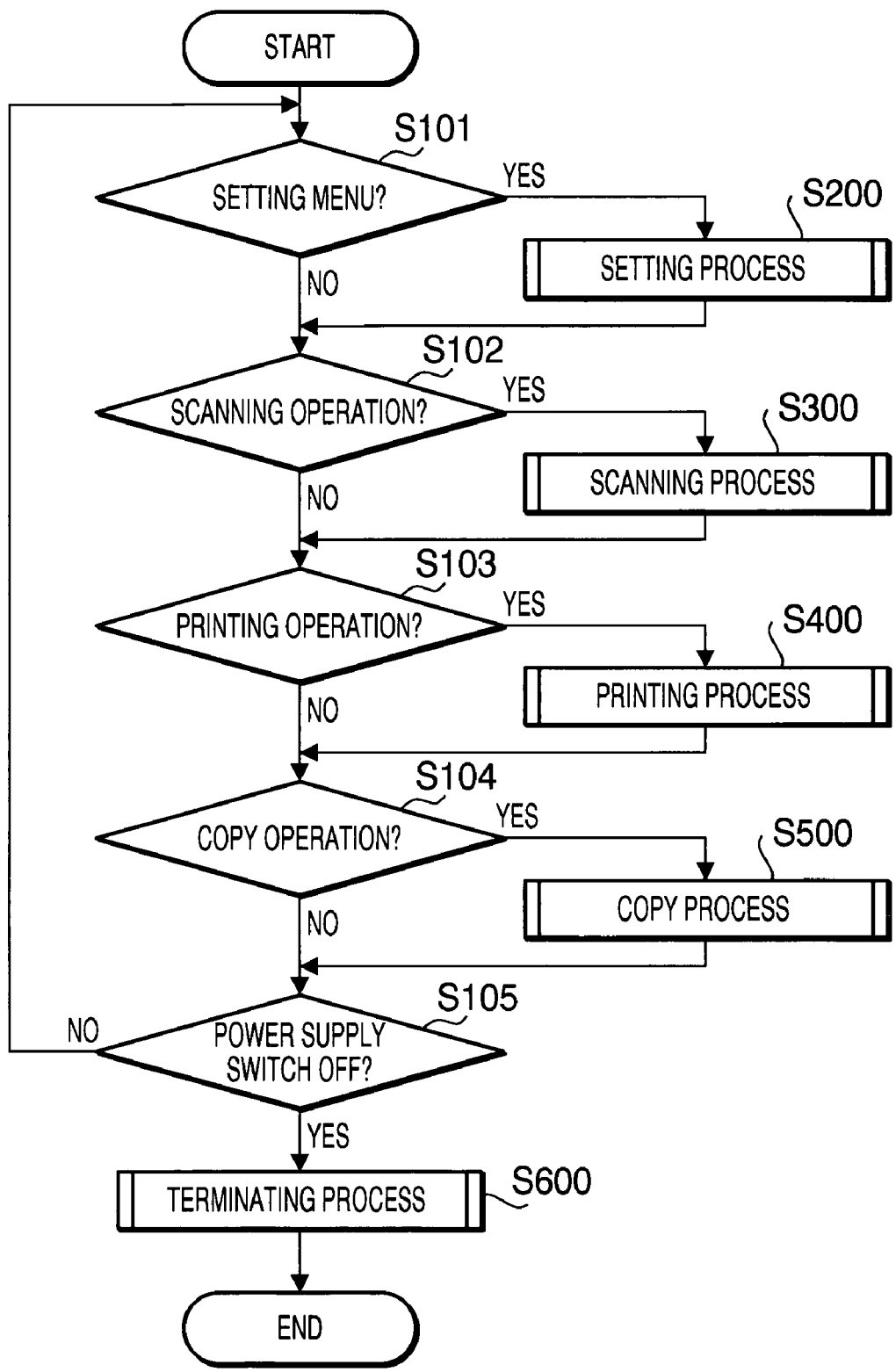
FIG. 4 is a flowchart illustrating a main operation of a digital multi function peripheral (MFP) in the embodiment according to one or more aspects of the present invention.

Operations of the data management system 1 configured as above will be explained with reference to FIGS. 4 to 8. FIG. 4 is a flowchart illustrating a main operation of the digital MFP 30 in the present embodiment. As shown in FIG. 4, after the digital MFP 30 is launched, the digital MFP 30 keeps waiting for a user operation. At this time, it is judged whether the user operation is for selecting a setting menu (S101), for performing a scanning operation with the scanner 36 (S102), for performing a printing operation instructed by the PC 20 (S103), for performing a copy operation (S104), or for turning the power supply switch 38 off (S105). Then, there is performed a setting process (S200), scanning process (S300), printing process (S400), copy process (S500), or terminating process (S600) in response to a corresponding one of the aforementioned user operations. When there is no user operation, the steps S101 to S105 are repeated to wait for a user operation. Hereinafter, each of the processes will be described.

Figure 5:
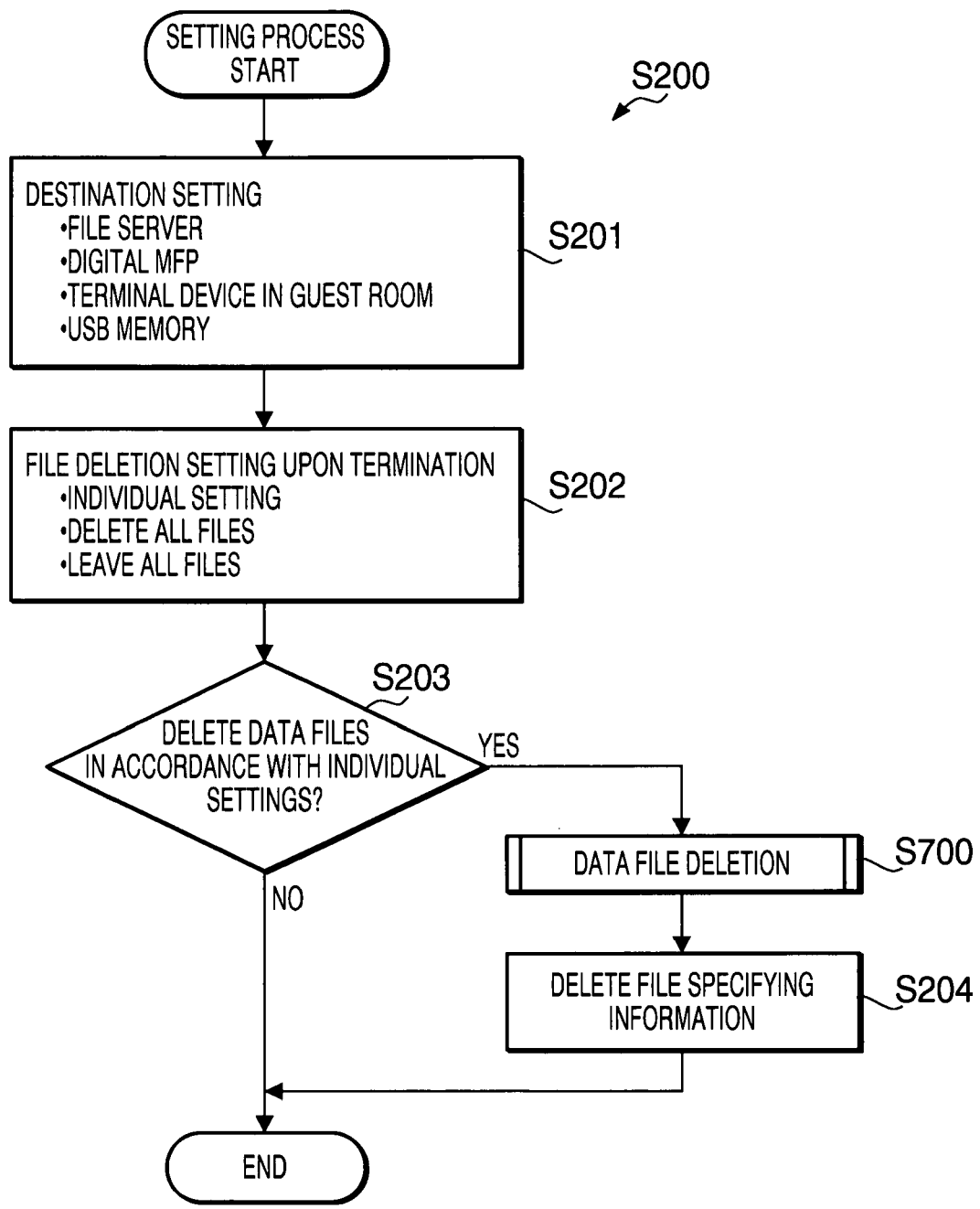
FIG. 5 is a flowchart showing a detailed procedure of a setting process in the embodiment according to one or more aspects of the present invention.

When the setting menu is selected by operating the display-operation unit 37, the setting process (S200) as shown in FIG. 5 is executed. As shown in FIG. 5, in the setting process, firstly a setting input for specifying the destination into which the data file is stored is accepted (S201). For example, there are cited as the destination into which the data file is stored that is specified by the setting input, the file server 40, the digital MFP 30, PC 20 (terminal device in a guest room), and the USB memory to be connected to the digital MFP 30. When the user tries to save the data file into the file server 40, information such as an IP address of the file server 40, folder path of the destination, and password (if necessary) is inputted. The information is stored in the setting recording area 321.

Next, an input for a file deletion setting upon termination is accepted (S202). The file deletion setting upon termination is a setting for determining whether to delete data files stored until a time when the power supply switch 38 is turned off, namely, a setting for inputting the aforementioned deletion permission information or a setting for determining timing when the deletion permission information is to be inputted. As shown in FIG. 5, for example, there are prepared as options for the setting, "Individual Setting," "Delete All Files," and "Leave All Files." The "Individual Setting" is a mode in which every time a data file is created, there is required an input for determining whether to delete the created data file when the digital MFP 30 is powered off. The "Delete All Files" is a mode in which every time a data file is created, there is not required an input for determining whether to delete the data file, yet it is a mode to delete all data files. Meanwhile, the "Leave All Files" is a mode to leave all data files.

Next, separately from the aforementioned file deletion setting upon termination, there is displayed a menu for determining whether to delete data files in accordance with individual settings thereof so as to induce a user's operation (S203). When the user wishes to delete data files in accordance with individual settings thereof, the data files to be deleted are determined on the menu. When the user selects the "Individual Setting" (S203: Yes), a data file deletion process is performed in accordance with the deletion command issued by the instructing unit 350 (S700), and thereafter the data specifying information (such as the file name and file created date and time) stored in the operation recording area 322 is deleted (S204).

Figure 6:
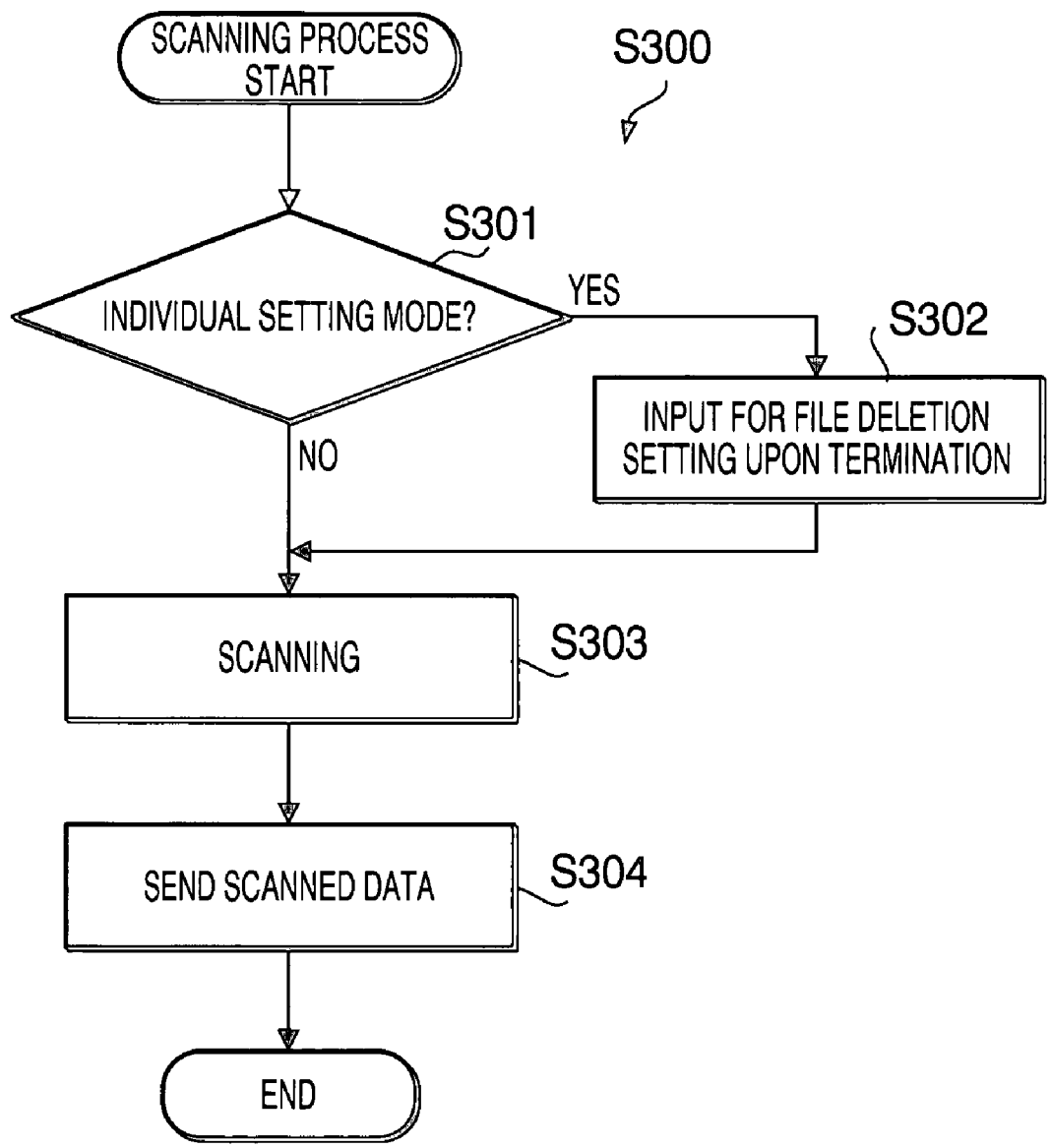
FIG. 6 is a flowchart showing a detailed procedure of a scanning process in the embodiment according to one or more aspects of the present invention.

In FIG. 4, when the scanning operation is selected by a user operation of the display-operation unit 37 (S102: Yes), the scanning process (S300) as shown in FIG. 6 is executed. As shown in FIG. 6, when the scanning process is launched, firstly, it is judged whether the file deletion setting upon termination is set in the "Individual Setting" mode (S301). When it is judged that the file deletion setting upon termination is set in the "Individual Setting" mode (S301: Yes), it is required to give an input for the file deletion setting upon termination (S302). Specifically, it is required to give an input for determining whether to delete image data to be scanned from now when the power supply switch 38 is turned off. The input is temporarily stored in the storing unit 320, and stored in a manner associated with the data file as the deletion permission information representing "Yes (approval of data deletion)" or "No (disapproval of data deletion)" by the adding unit 380 when the data file is saved in either the digital MFP 30 or the external device.

Meanwhile, when it is not judged that the file deletion setting upon termination is set in the "Individual Setting" mode (S301: No), or when the input for the file deletion setting upon termination is completely done (S302), the control unit 310 controls the scanner 36 to scan the image (S303). The image data obtained by scanning the image are sent along with the deletion permission information by the data sending unit 341, for example, to the file server 40 in accordance with the setting regarding the destination. Further, the image data are received by the receiving unit 441 and stored in the storing unit 420 (S304). As a matter of course, even when the destination is the digital MFP 30 or USB memory, the data file is stored in each of them along with the deletion permission information.

In FIG. 4, when the printing operation or copy operation is selected, the printing process (S400) or copy process (S500) is executed in a widely known method thereof. Detailed explanations of the printing process and copy process will be omitted here.

Figure 7:
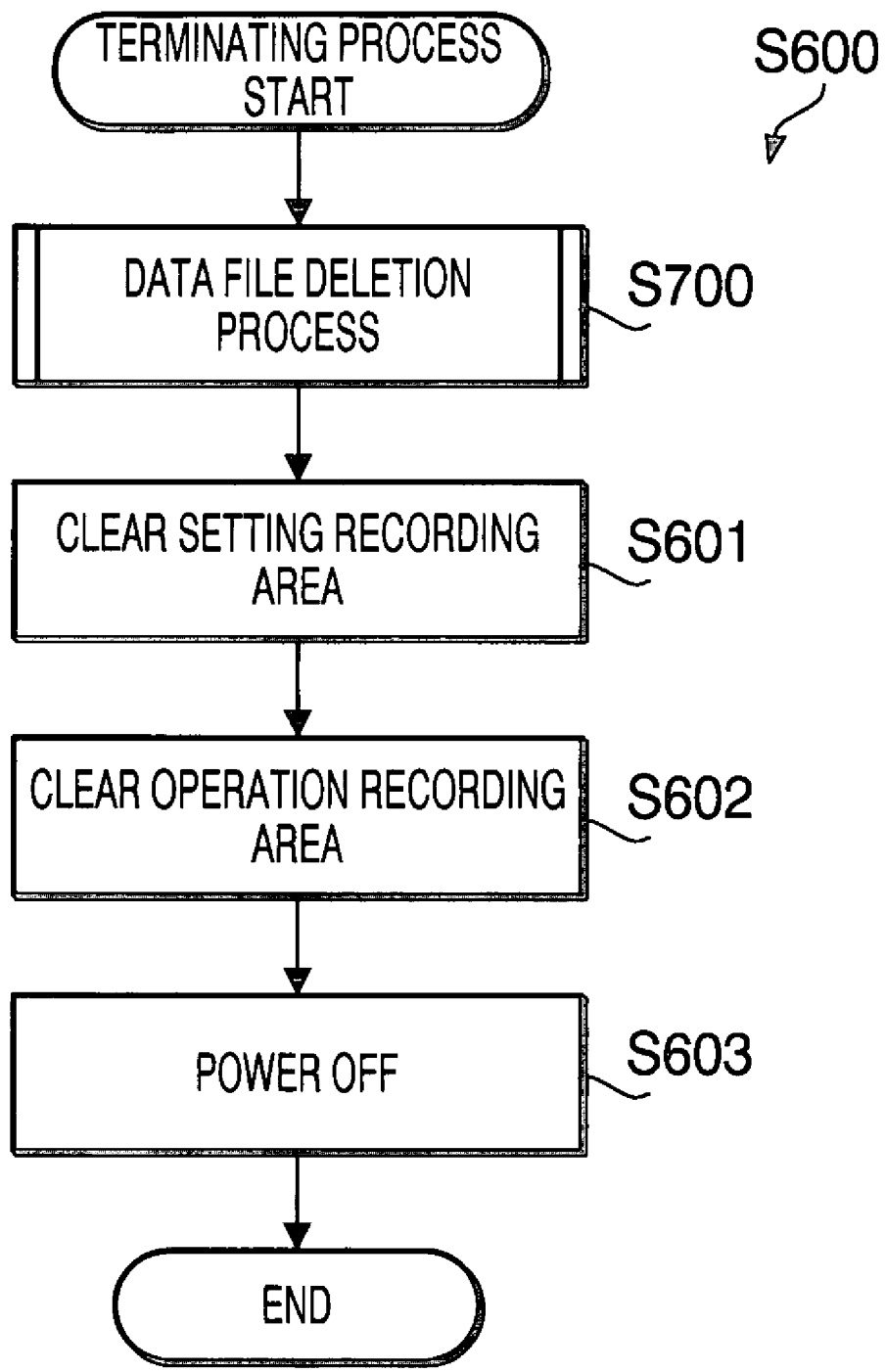
FIG. 7 is a flowchart showing a detailed procedure of a terminating process in the embodiment according to one or more aspects of the present invention.

In FIG. 4, when the power supply switch 38 is turned off (S105: Yes), the terminating process (S600) is executed. As shown in FIG. 7, in the terminating process, firstly, the data file to be deleted is deleted from the destination based on the information stored in the operation recording area 322 in accordance with the deletion command issued by the instructing unit 350 (S700). Details of the process of deleting the data file in S700 will be described below.

Thereafter, the setting recording area 321 is cleared (S601), and next the operation recording area 322 is cleared (S602). Then, after the aforementioned data deletion is completed, the digital MFP 30 is powered off (S603). Thus, the operation recording area 322 is cleared after the data file is deleted. Therefore, the data file is certainly deleted without losing the information regarding the destination where the data file is saved. Further, since the deletion of the information in setting recording area 321 results in that the information regarding the file server 40 is deleted, there is no risk that the file server 40 is illegally accessed.

Figure 8:
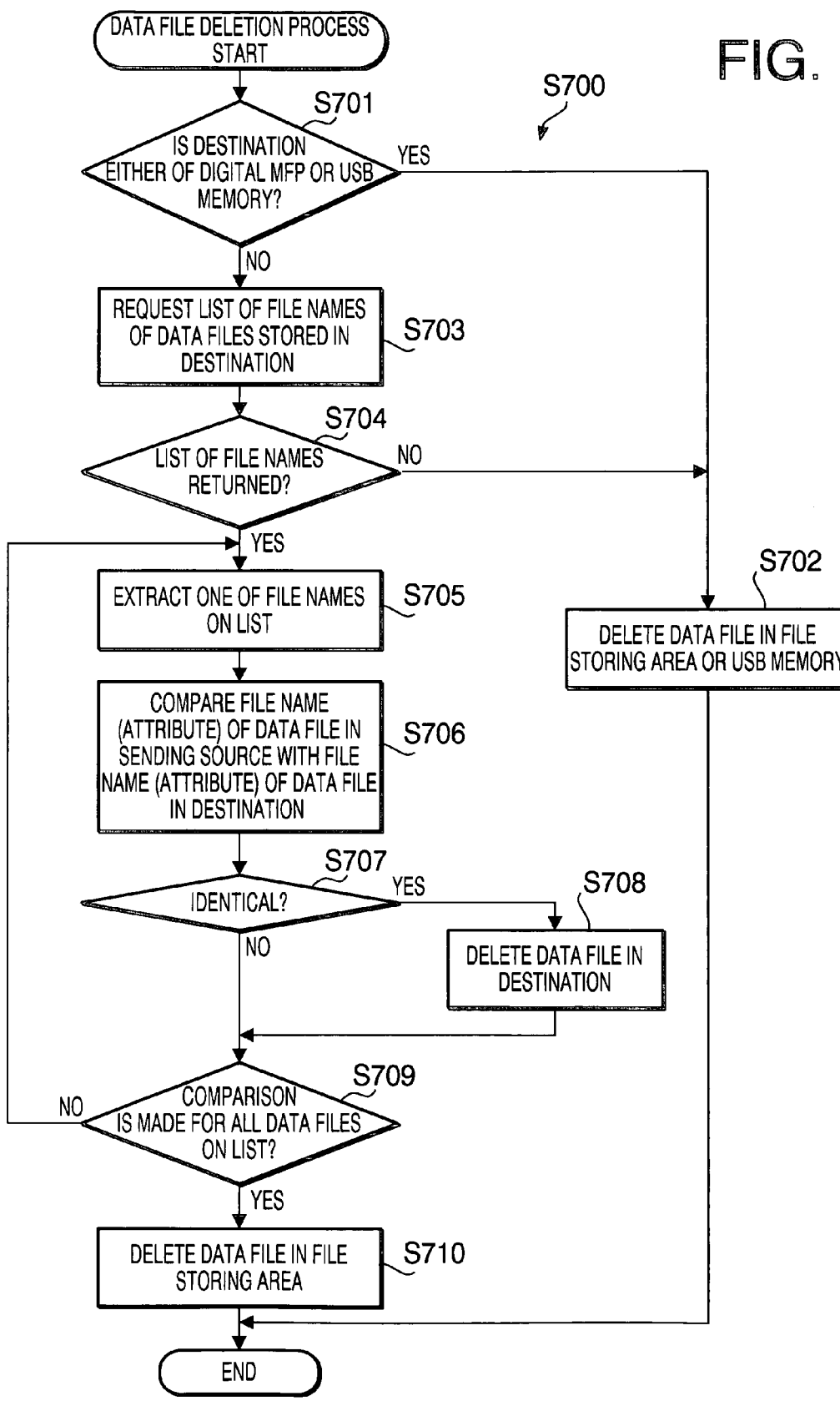
FIG. 8 is a flowchart showing a detailed procedure of a data file deletion process in the embodiment according to one or more aspects of the present invention.

Subsequently, the data file deletion process (S700) will be explained in detail. As shown in FIG. 8, when the data file deletion process is launched, it is judged whether the destination where the data file to be deleted is saved is either of the digital MFP 30 or USB memory (S701). The judgment can be made by referring to the information stored in the operation recording area 322. When it is judged that the destination where the data file to be deleted is saved is either of the digital MFP 30 or USB memory (S701: Yes), the data file stored in either of the file storing area 323 or the USB memory is deleted in accordance with the information regarding the destination where the data file is stored (S702), the present process is terminated.

Meanwhile, when it is not judged that the destination where the data file to be deleted is saved is either of the digital MFP 30 or USB memory (S701: No), the request unit 342 requests the list of the file names of the data files stored of the destination (e.g., file server 40) (S703). The file server 40 creates the list of the file names of the data files, and sends the list to the digital MFP 30.

In the digital MFP 30, the response receiving unit 343 receives the list of the file names of the data files as the data information. When the list is not returned by the file server 40 (S704: No), the present process goes to S702, and is then terminated. When the list is returned by the file server 40 (S704: Yes), the comparing unit 360 compares the file names on the list with the file name of the data file to be deleted to judge whether there is the file name of the data file to be deleted.

Therefore, the comparing unit 360 extracts a single file name (attribute of a data file) from the list (S705), and compares the file name (attribute) of the data file in the sending source (i.e., data file specified to be deleted at the digital MFP 30 side) with the extracted file name (S706). When the file names are identical to each other (S707: Yes), the data file stored in the destination is deleted. Specifically, the deletion request unit 344 sends a deletion request for deleting the data file to the file server 40 (S708).

Meanwhile, when the file names are not identical (S707: No), or after the deletion request is transmitted (S708), it is judged whether the comparison as above is carried out for all of the file names on the list (S709). When it is not judged that the comparison is carried out for all of the file names on the list (S709: No), the steps S705 to S709 are repeated. On the other hand, when it is judged that the comparison is carried out for all of the file names on the list (S709: Yes), the in-device data deleting unit 370 deletes the data file to be deleted that is saved in the file storing area 323 (S710).

It is noted that, although the file name is only used as the attribute of the data file in the above comparison, other attributes such as the file created date and time may be used along with the file name. In this case, since there are used in the comparison, not only the file name but also the file created date and time, a data file stored in the destination is deleted only when the data file has a file name and a file created date and time that are identical to those of the data file specified to be deleted at the digital MFP 30 side. Hence, even though there are a plurality of data files with the same file name, the data file to be deleted can properly selected and deleted.

As described above, according to the data management system 1 of the present embodiment, the user who has used the digital MFP 30 in a guest room of the hotel H can delete a data file stored in the file server 40 when the power supply switch 38 is turned off, even though the user has saved the data file created by scanning an image with the scanner 36 in the file server 40. Therefore, the user can delete the data file from the file server 40 only by turning the power of the digital MFP 30 off when the user checks out. Thereby, it is possible to prevent leakage of information.

In addition, when it is judged that there is stored no data file to be deleted in the file server 40, the data file to be deleted that is saved in the sending source is deleted. Accordingly, when the user stores a data file in the storing unit 320 of the digital MFP 30, the data file can appropriately be deleted.

Furthermore, when there is stored a file name of a data file specified by the data specifying information in the file server 40, the in-device data deleting unit 370 clears the operation recording area 322 in response to the deletion request being sent by the deletion request unit 344. Hence, since the data file can certainly be deleted, and the data specifying information is also deleted, it is possible to prevent leakage of information.

Additionally, as described above, by adding the deletion permission information when transmitting a data file to the file server 40, the data deleting unit 450 deletes the data file in case where the data file is identified as a subject to be deleted by referring to the deletion permission information. Therefore, when the user sends a data file, the user can previously specify the data file as a subject to be deleted. Thus it is possible to prevent leakage of information that might be caused due to that the user forgets to delete the data file. In the meantime, when the user wishes to leave the data file in the file server 40, it is possible to leave the data file by adding the deletion permission information representing "No (disapproval of data deletion)."

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

In the aforementioned embodiment, there has been described the case where the digital MFP 30 performs data transmission to the file server 40 as an example of the external device outside the hotel H. However, the external device according to aspects of the present invention may be any storage device other than the information processing device (digital MFP 30). For example, the external device may include the USB memory and PC 20. Thus, the present invention can be applied to the case where the data are stored into the external storage device without being transmitted through a network. Additionally, although the file server 40 and the digital MFP 30 are connected via the Internet INT in the aforementioned embodiment, they may be connected via the LAN.

What is claimed is:

1. A data management system, comprising:
an information processing device; and
an external device communicably connected with the information processing device,
wherein the information processing device comprises:
a processor configured to, when executing computer readable instructions provide:
a data sending unit configured to send a data file to the external device;
a specifying information storing unit configured to store therein data specifying information for specifying the data file sent by the data sending unit;
an instructing unit configured to issue a deletion command for deleting the data file, the instructing unit issues the deletion command in response to an external instruction to turn the information processing device off;
a request unit configured to send a request for data information regarding a data file stored in the external device to the external device, the request unit sending the request for data information regarding the data file stored in the external device to the external device in response to the deletion command being issued by the instructing unit;
a response receiving unit configured to receive the data information as a response to the request by the request unit;
a judging unit configured to judge whether the data file specified by the data information received by the response receiving unit includes the data file specified by the data specifying information stored in the specifying information storing unit; and
a deletion request unit configured to send a deletion request for deleting the data file specified by the data specifying information to the external device when the judging unit judges that the data file specified by the data information includes the data file specified by the data specifying information, and
wherein the external device comprises:
a processor configured to, when executing computer readable instruction provide:
a receiving unit configured to receive the data file sent by the data sending unit;
an external-device-side storing unit configured to store therein the data file received by the receiving unit;
a response sending unit configured to send the data information regarding the data file stored in the external-device-side storing unit to the information processing device as a response to the request sent by the request unit; and
a data deleting unit configured to delete the data file stored in the external-device-side storing unit in response to the deletion request being sent by the deletion request unit.

2. The data management system according to claim 1,
wherein the information processing device further comprises:
an information-processing-device-side storing unit configured to store therein the data file specified by the data specifying information; and
an in-device data deleting unit configured to delete the data file specified by the data specifying information from the information-processing-device-side storing unit in response to the data information regarding the data file stored in the external device being sent by the request unit.

3. The data management system according to claim 1,
wherein the information processing device further comprises a data specifying information deleting unit configured to delete the data specifying information from the specifying information storing unit in response to the deletion request being sent by the deletion request unit when the judging unit judges that the data file specified by the data information includes the data file specified by the data specifying information.

4. The data management system according to claim 1,
wherein the information processing device further comprises an adding unit configured to add, to the data file to be sent by the data sending unit, deletion permission information representing whether the data file is identified as a subject to be deleted,
wherein the data sending unit sends the data file along with the deletion permission information to the external device,
wherein the external-device-side storing unit stores therein the deletion permission information in a manner associated with the data file, and
wherein the data deleting unit deletes the data file when referring to the deletion permission information and judging that the data file is identified as a subject to be deleted.

5. The data management system according to claim 1,
wherein the information processing device further comprises a deletion mode setting unit configured to set one of a first deletion mode, second deletion mode, and third deletion mode,
wherein the first deletion mode is a mode in which it is individually determined for each data file created in the information processing device whether the created data file is permitted to be deleted by the data deleting unit,
wherein the second deletion mode is a mode in which all created data files are permitted to be deleted by the data deleting unit, and
wherein the third deletion mode is a mode in which any created data file is not permitted is to be deleted by the data deleting unit.

6. An information processing device configured to be communicably connected with an external device, comprising:
a processor configured to, when executing computer readable instructions provide:
a data sending unit configured to send a data file to the external device;
a specifying information storing unit configured to store therein data specifying information for specifying the data file sent by the data sending unit;
an instructing unit configured to issue a deletion command for deleting the data file, the instructing unit issues the deletion command in response to an external instruction to turn the information processing device off;
a request unit configured to send a request for data information regarding a data file stored in the external device to the external device, the request unit sending the request for data information regarding the data file stored in the external device to the external device in response to the deletion command being issued by the instructing unit;

a response receiving unit configured to receive the data information as a response to the request by the request unit;

a judging unit configured to judge whether the data file specified by the data information received by the response receiving unit includes the data file specified by the data specifying information stored in the specifying information storing unit; and a deletion request unit configured to send a deletion request for deleting the data file specified by the data specifying information to the external device when the judging unit judges that the data file specified by the data information includes the data file specified by the data specifying information, wherein the external device receives the data file sent by the data sending unit, stores the data file, sends the data information regarding the data file to the information processing device as a response to the request sent by the request unit and deletes the data file in response to the deletion request being sent by the deletion request unit.

7. The information processing device according to claim 6, further comprising:

an information-processing-device-side storing unit configured to store therein the data file specified by the data specifying information; and an in-device data deleting unit configured to delete the data file specified by the data specifying information from the information-processing-device-side storing unit in response to the data information regarding the data file stored in the external device being sent by the request unit.

8. The information processing device according to claim 6, further comprising a data specifying information deleting unit configured to delete the data specifying information from the specifying information storing unit in response to the deletion request being sent by the deletion request unit when the judging unit judges that the data file specified by the data information includes the data file specified by the data specifying information.

9. The information processing device according to claim 6, further comprising an adding unit configured to add, to the data file to be sent by the data sending unit, deletion permission information representing whether the data file is identified as a subject to be deleted, wherein the data sending unit sends the data file along with the deletion permission information to the external device.

10. The information processing device according to claim 6, further comprising a deletion mode setting unit configured to set one of a first deletion mode, second deletion mode, and third deletion mode, wherein the first deletion mode is a mode in which it is individually determined for each data file created in the information processing device whether the created data file is permitted to be deleted in the external device, wherein the second deletion mode is a mode in which all created data files are permitted to be deleted in the external device, and wherein the third deletion mode is a mode in which any created data file is not permitted is to be deleted in the external device.

11. A computer readable storage device comprising at least one computer readable medium having a first and a second set of computer readable instructions stored thereon, said first set of computer readable instructions which causes a computer in an information processing device to perform a method of:

sending a data file to an external device;

storing data specifying information for specifying the data file sent;

issuing a deletion command for deleting the data file in response to an external instruction to turn the information processing device off;

sending a request for data information regarding a data file stored in the external device to the external device, the sending the request for data information regarding the data file stored in the external device to the external device being in response to the deletion command;

receiving the data information as a response to the request sent;

judging whether the data file specified by the data information includes the data file specified by the data specifying information; and sending a deletion request for deleting the data file specified by the data specifying information to the external device when it is judged that the data file specified by the data information includes the data file specified by the data specifying information and said second set of computer readable instructions causes a computer in said external device to perform the method of:

receiving the data file sent by the data sending unit;

storing the data file;

sending the data information regarding the data file to the information processing device as a response to the request sent by the request unit; and deleting the data file in response to the deletion request being sent by the deletion request unit.

* * * * *